US012467613B1

(12) United States Patent
Zimmerman et al.

(10) Patent No.: US 12,467,613 B1
(45) Date of Patent: Nov. 11, 2025

(54) MAGNETIC BULB HOLDER CLIP

(71) Applicants: Fredrick Zimmerman, Uncasville, CT (US); Dean Stiteler, Camp Hill, PA (US); Loren A. Roper, Omaha, NE (US)

(72) Inventors: Fredrick Zimmerman, Uncasville, CT (US); Dean Stiteler, Camp Hill, PA (US); Loren A. Roper, Omaha, NE (US)

( * ) Notice: Subject to any disclaimer, the term of this patent is extended or adjusted under 35 U.S.C. 154(b) by 0 days.

(21) Appl. No.: 19/022,470

(22) Filed: Jan. 15, 2025

Related U.S. Application Data

(60) Provisional application No. 63/621,028, filed on Jan. 15, 2024.

(51) Int. Cl.

| | |
|---|---|
| ***F21V 21/096*** | (2006.01) |
| ***F21S 4/00*** | (2016.01) |
| ***F21S 4/10*** | (2016.01) |
| ***F21S 4/15*** | (2016.01) |
| ***F21V 19/00*** | (2006.01) |
| ***F21V 19/06*** | (2006.01) |
| ***F21V 21/088*** | (2006.01) |

(52) U.S. Cl.
CPC .......... *F21V 21/096* (2013.01); *F21V 21/088* (2013.01); *F21S 4/00* (2013.01); *F21S 4/10* (2016.01); *F21S 4/15* (2016.01); *F21V 19/004* (2013.01); *F21V 19/006* (2013.01); *F21V 19/0065* (2013.01); *F21V 19/007* (2013.01); *F21V 19/06* (2013.01); *F21V 21/0885* (2013.01); *F21V 21/0965* (2013.01)

(58) Field of Classification Search
CPC .. F21S 4/00; F21S 4/10; F21V 21/088; F21V 21/0885; F21V 21/096; F21V 19/004; F21V 19/06; F21V 19/006; F21V 19/0065
See application file for complete search history.

(56) References Cited

U.S. PATENT DOCUMENTS

| | | | | |
|---|---|---|---|---|
| 3,479,636 A * | 11/1969 | McBride | F21V 19/0005 | 248/316.1 |
| 2009/0185370 A1* | 7/2009 | Moore | F21S 4/10 | 362/219 |
| 2011/0038159 A1* | 2/2011 | Carlson | F21S 4/10 | 362/249.16 |
| 2019/0257502 A1* | 8/2019 | Felt | F21V 21/088 | |
| 2022/0010946 A1* | 1/2022 | Chen | F21V 17/164 | |

* cited by examiner

*Primary Examiner* — Colin J Cattanach
(74) *Attorney, Agent, or Firm* — Hooker & Habib, P.C.

(57) ABSTRACT

A bulb holder clip includes a tubular body and a slot. The body surrounds an interior volume and extends to an open end of the body. The slot is formed in the body and enables a bulb socket attached to a wire to be received into the body. The socket while held in the body receives and holds a light bulb inserted into the socket from the open end of the body. At least one magnet is attached directly to the body or to an end wall closing a closed end of the body to support the clip while holding the socket and bulb against a holding surface for display.

20 Claims, 4 Drawing Sheets

MAGNETIC BULB HOLDER CLIP

RELATED APPLICATION

This application is a non-provisional of and claims priority to U.S. provisional patent application Ser. No. 63/621,028 titled "Magnetic Bulb Holder Clip" filed Jan. 15, 2024.

FIELD OF THE DISCLOSURE

The disclosure relates to the field of supporting ornamentation for display, and in particular, to supporting light bulbs for display on indoor or outdoor structures.

BACKGROUND OF THE DISCLOSURE

Bulb holder clips are known that receive and hold socketed light bulbs, such as light bulbs held in C7 or C9 type light bulb sockets often used for holiday lighting displays. The light bulb sockets may be attached to and spaced along a length of wire that transmits electricity to the light bulb sockets.

The bulb holder clip includes structure that mounts the bulb holder clip to a holding structure, such as a rain gutter or between shingles.

There is a need for a bulb holder clip that can securely receive a socketed light bulb and is easily attachable and detachable from a holding structure.

SUMMARY OF THE DISCLOSURE

Disclosed is a bulb holder clip having a body that receives and secures a socketed light bulb to the clip. The clip includes one or more magnets located on the outside of the clip. The one or more magnets can be used individually or in combination to releasably mount the bulb holder clip to a compatible mounting surface of a holding structure.

If the mounting surface is formed of a magnetic material, the one or more magnets can be used to mount the bulb holder clip onto the magnetic surface.

If the mounting surface is formed of a non-magnetic material (for example, an outer surface of an aluminum gutter) a steel or other magnetic holding member can be placed on a backing surface of the mounting article whereby the one or more magnets of the clip attract the magnetic holding member to sandwich the mounting surface between the one or more magnets and the magnetic holder member.

A magnetic bulb holder clip in accordance with this disclosure includes a generally tubular body that extends axially between an open, bulb-receiving first end and an axially opposite second end. A portion of the tubular body is cut away to receive a light bulb socket inside the tubular body. In an embodiment, the clip includes two magnets. A first, generally rectangular magnet is attached to the outside of the body and extends parallel with the body axis. A second, generally circular magnet is attached to the outside of the second end of the body.

The disclosed magnetic bulb holder clip enables the bulb and socket to be removably attached onto a mounting surface. A clip can sit, for example, on the roof of a parapet wall pointing forward and thereby reducing the odds of a large bird landing on the clip, socket, or bulb. Removing the clip or a number of clips from the mounting surface at the end of a lighting season can often be made by simply pulling on the wire connected to the sockets to remove a number of clips at the same time. The bulb and socket remain held by the clip when removed for off-season storage or the like so that there is no need to reattach the clips and sockets at the beginning of the next lighting season.

Other objects and features of the disclosure will become apparent as the description proceeds, especially when taken in conjunction with the accompanying drawing sheets illustrating one or more illustrative embodiments.

DETAILED DESCRIPTION

Figure 1:
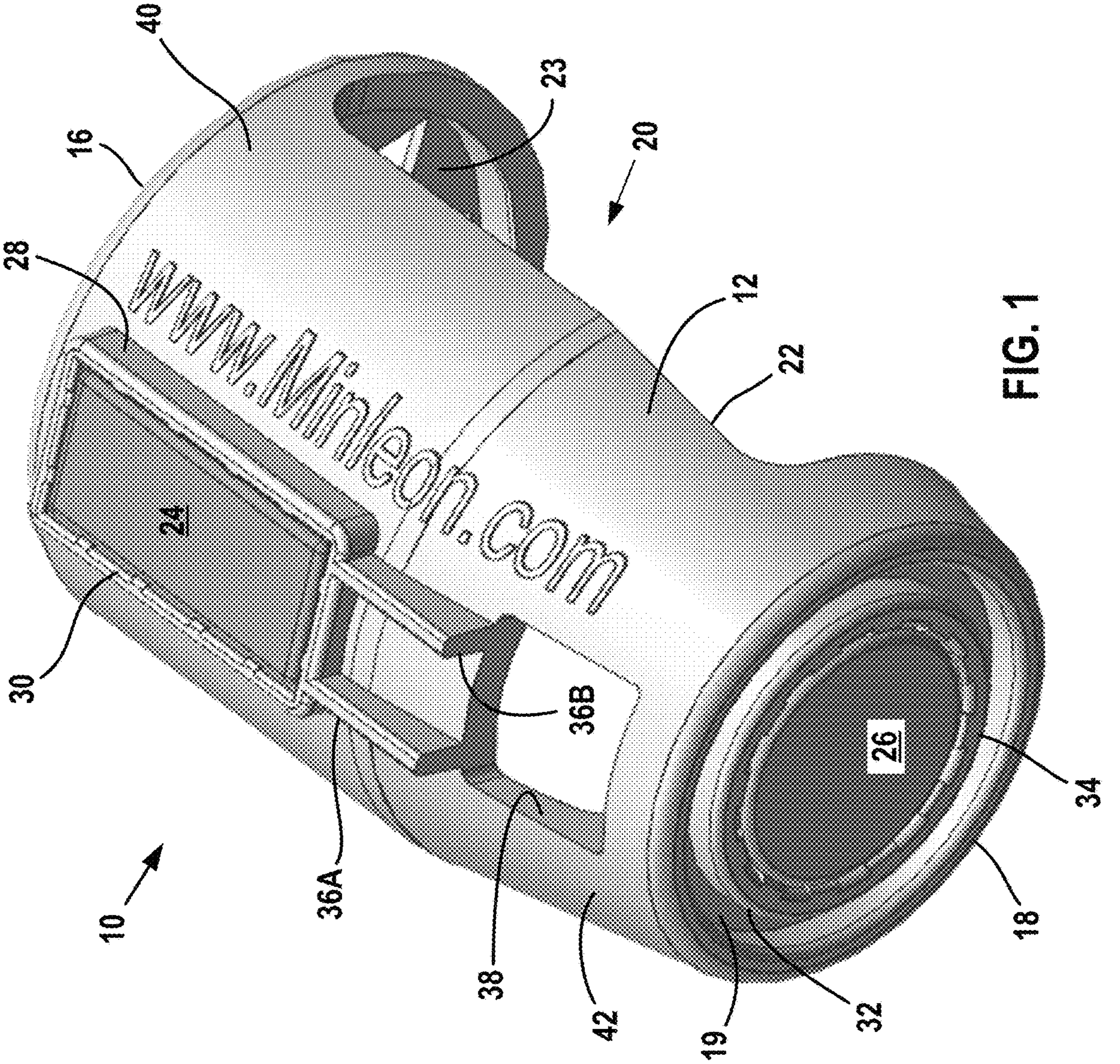
FIG. 1 is a perspective view of a magnetic bulb holder clip in accordance with this disclosure.
Figure 2:
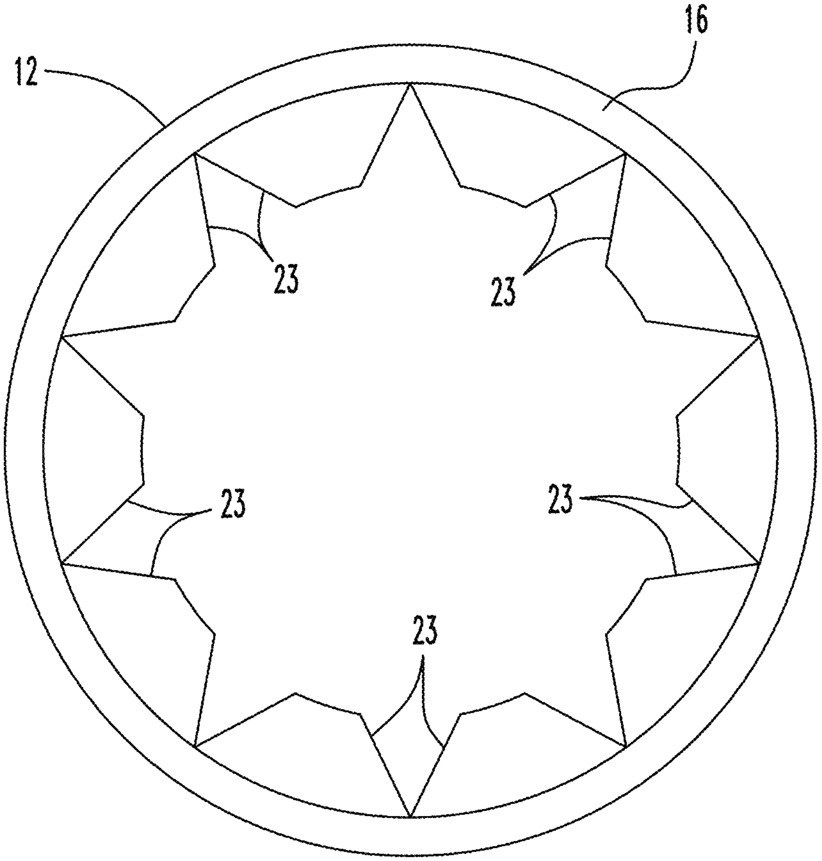
FIG. 2 is a simplified top view of the magnetic bulb holder clip taken along line 2-2 of FIG. 3 to illustrate the tabs of the clip body.
Figure 3:
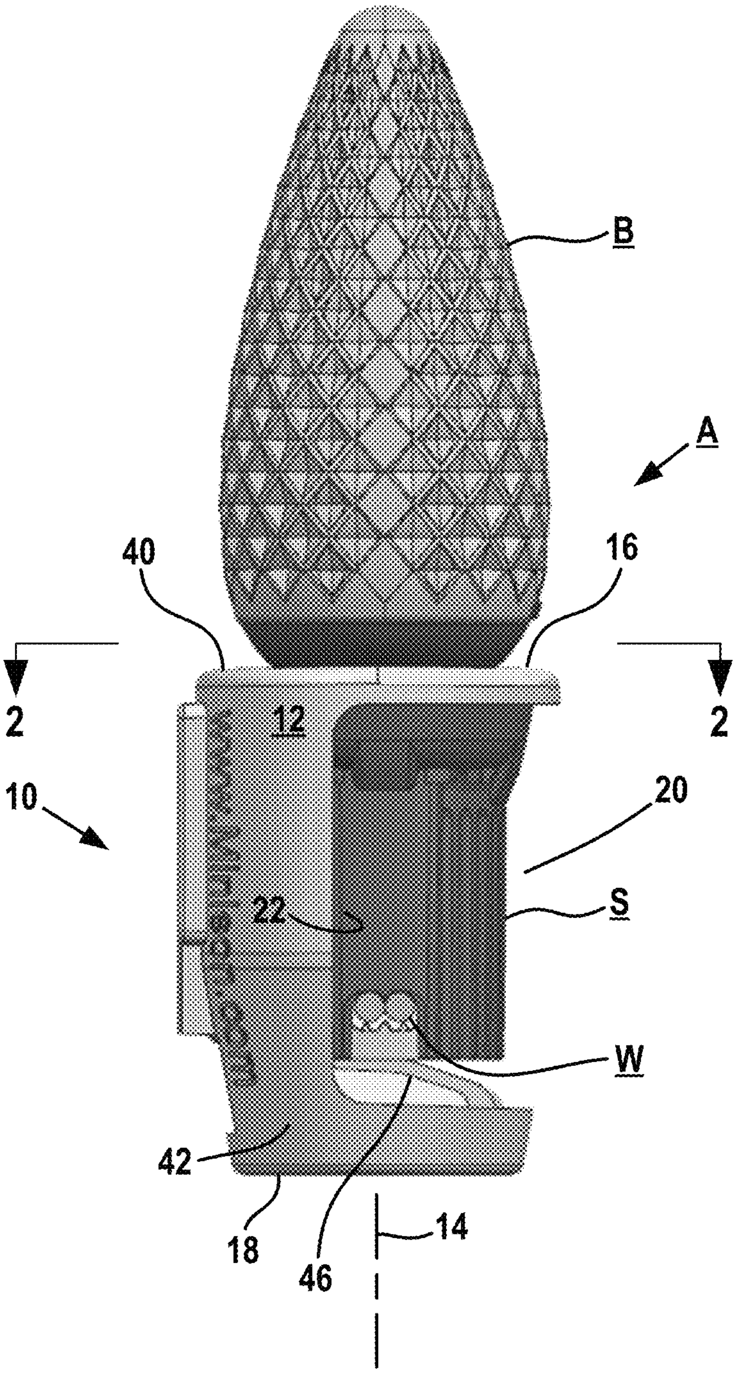
FIG. 3 is a side view of the magnetic bulb holder clip holding a C-type light bulb socket assembly consisting of a C9 light bulb socket holding a C9 light bulb.

FIGS. 1-3 illustrate an embodiment of a magnetic bulb holder clip 10 ("clip") designed for holding a light bulb held in a C9 light bulb socket in accordance with this disclosure. FIGS. 1 and 2 illustrate the clip 10 alone. FIG. 3 illustrates the clip 10 holding a C9 light bulb socket S, which socket in turn is holding a C9 light bulb B. The light bulb B is shown received in a bulb-receiving end of the light bulb socket S.

The clip 10 includes a generally tubular body 12 that extends along an axial center line 14. The illustrated clip body 12 is a one-piece molded plastic member formed from a resin. The resin may be a resin or mixture of resins capable of forming a clip body 12 suitable for the environment of use. Other suitable materials may also be used.

The clip body 12 extends axially between an open, bulb-receiving first end 16 and an axially opposite closed second end 18. In the illustrated embodiment the second end 18 is closed by an end wall 19. A portion of the tubular body 12 spaced inwardly from the body ends is cut away to define a slot 20 bounded by a peripheral wall 22. The slot 20 is sized receive a light bulb socket extending parallel with the socket center line 14 inside the clip body 12. The slot 20 also has an angular extent of more than 180 degrees about the axial center line 14. The angular width of the slot 20 is selected to enable SPT-1 or SPT-2 wire W (see FIG. 3) to extend straight into and straight out of the light bulb socket S held in the clip 10 without obstruction from the clip body 12.

As best seen in FIG. 2, the clip body 12 at the first end 16 has a number of circumferentially-spaced thin tabs 23 extending radially from the clip body inner wall into the tubular clip body. The tabs 23 are flush with the clip body first end 16. The tabs 23 assist in gripping a light bulb B inserted into the clip body first end 16. In addition to gripping the light bulb, the tabs 23 enable moisture from rain, dew, condensation, and the like to run off between the held light bulb and the clip body and drain away from the clip 10.

In the illustrated embodiment, the clip 10 includes two magnets. A first, generally rectangular bar magnet 24 is attached to the outside of the clip body 12. A second, generally circular bar magnet 26 is attached to the outer surface of the end wall 19.

The first magnet 24 is closely received within an outer rectangular frame 28 that forms part of the clip body 12 and extends away from the immediately adjacent portions of the clip body. The frame 28 is closely spaced from the clip body first end 16 and is centered between the adjacent sides of the peripheral wall 20. The frame 28 has a pair of spaced apart longer walls that extend axially along the clip body 12, and a pair of shorter walls that extend perpendicularly to the longer walls. The frame walls extend to a flat upper surface 30 of the frame 28 that is near flush with the exposed upper surface of the first magnet 24.

The second magnet 26 is closely received within an outer circular frame 32 that forms part of the end wall 19 of the clip body 12 and extends away from the immediately adjacent portions of the end wall. The circular frame 32 is centered about the body center line 14. The circular frame extends to an upper surface 34 that is near flush with the exposed upper surface of the second magnet 26.

The clip body 12 further includes a pair of spaced-apart, parallel walls 36A, 36B that extend axially from the rectangular frame 28 towards the clip body second end 18. The upper surfaces of the walls 36A, 36B are flat and co-planar with the frame upper surface 30. The walls 36A, 36B provide additional support of the clip body 12 against a holding surface that is engaged against the first magnet 24.

The illustrated clip body 12 further includes a rectangular through-hole 38 that extends axially from the walls 36A, 36B towards the clip body second end 18. The through-hole 38 further assists in draining moisture out of the clip 10.

As best seen in FIGS. 1 and 3, the portion 40 of the clip body 12 extending axially from the clip body first end 16 to a short distance beyond the rectangular frame 28 has a constant outer radius or outer diameter. The portion 42 of the clip body 12 extending axially from the clip body constant-radius/diameter portion 40 to the clip body second end 18 has a radius/diameter that decreases as the clip body portion 42 extends towards the clip body closed end 18.

FIG. 3 illustrates the clip 10 securely holding an assembled socket assembly A made of the C9 light bulb socket S and the C9 light bulb B. The light bulb socket S had been previously attached to a length of SPT-2 wire W.

Prior to installation, the socket S and the bulb B are not attached to one another. The socket S with the attached portion of the wire W is inserted into the slot 20 of the clip body 10. The bulb receiving end of the socket S is placed adjacent to and centered beneath the first end 16 of the clip body 12. The clip 10 can include an integral, resilient spring arm 46 or equivalent member that urges the socket S towards the first end 16 of the clip body 12 to assist in attaching the bulb B.

The threaded end of the bulb B is inserted into the first end 16 of the clip body 12. The bulb B is then screwed into the socket S in a conventional manner to form the assembled socket assembly A. The bulb B and the socket S of the socket assembly A sandwich the portion of the clip body 12 between them, essentially fixing the clip 10 relative to the assembled socket assembly A.

Figure 4:
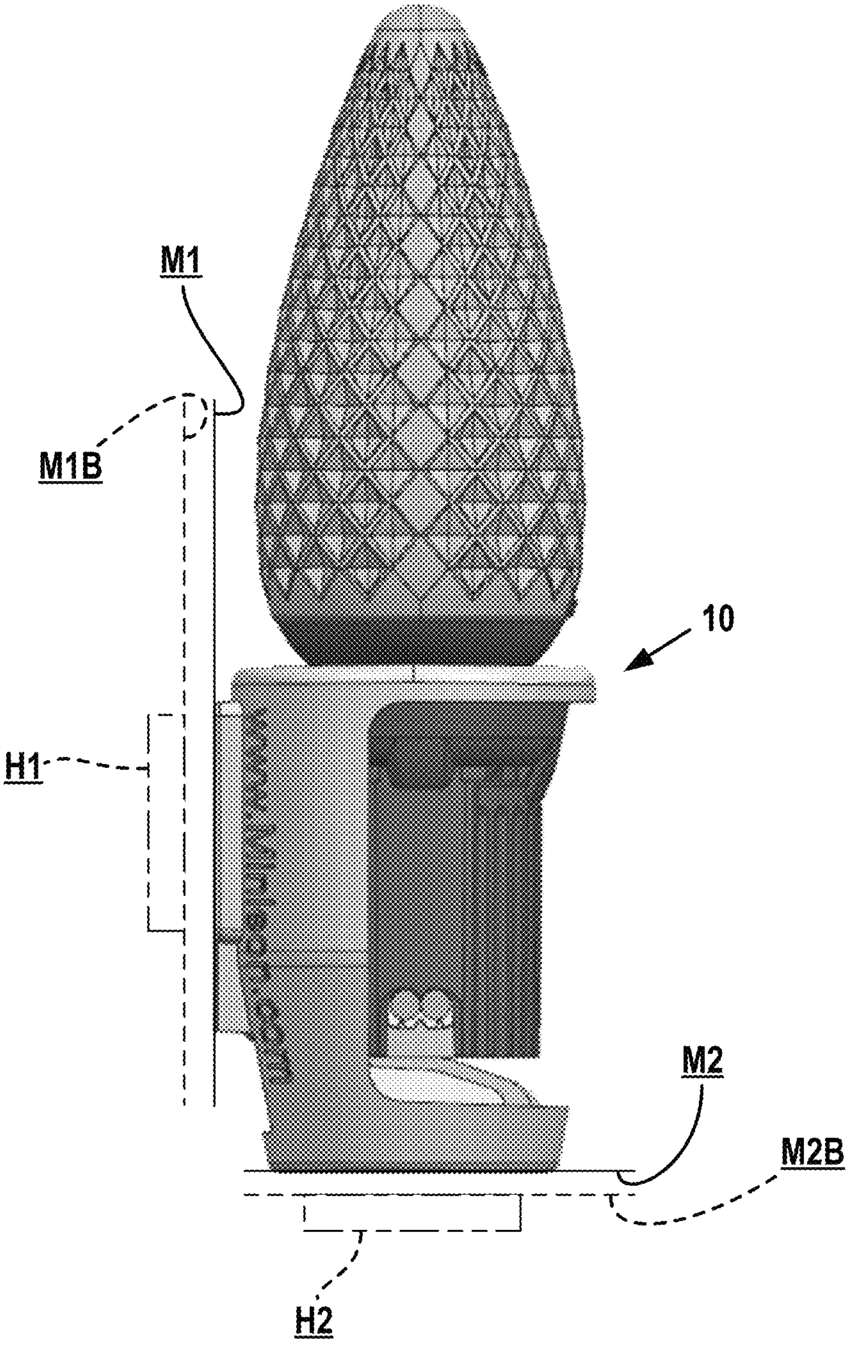
FIG. 4 illustrates mounting the magnetic bulb holder clip as shown in FIG. 3 on various surfaces.

FIG. 4 is similar to FIG. 3 and illustrates the clip 10 held against a first flat magnetic holding surface M1 by the first magnet 24. The clip body rectangular frame 28 and body walls 36A, 36B rest against the surface M1 and position the clip center line 14 parallel with the surface M1. The frame 28 and body walls 36A, 38B also space the remainder of the clip body 12 and the bulb B away from the surface M1. The magnet 24 is spaced in the radial direction away from the clip center line a sufficient distance for clearance between the surface M1 and the bulb B.

If the surface M1 is a nonmagnetic surface of a relatively thin member, a metal or magnetic holding member H1 can be placed on a backing surface M1B of the member. The holding member H1 is placed facing the first magnet 24 and urges the first magnet 24 against the surface M1.

FIG. 4 also illustrates the clip 10 mounted on a second flat magnetic holding surface M2 by the second magnet 26. The clip body second end 18 is configured to rest against the surface M2 and positions the clip center line 14 perpendicularly with respect to the surface M2.

If the surface M2 is a nonmagnetic surface of a relatively thin member, a metal or magnetic holding member H2 can be placed on a backing surface M2B of the member. The holding member H2 is placed facing the second magnet 26 and urges the second magnet 26 against the surface M2.

The use of a magnet or magnets to attach a number of two or more clips 10 extending along a wire W to a holding surface enables a user to vary the relative spacing and positioning of the clips 10 relative to one another along the surface. The clips can be positioned along a straight line, an arc, or a serpentine line. Clip spacing between adjacent clips can be uniform or non-uniform and are easily adjustable. The user has great flexibility in positioning the clips and can create novel and unique ornamental lighting designs.

Removing a string of clips 10 from a surface does not require removing the bulbs from the sockets. A string of clips and their attached socket assemblies can be stored without removing the socket assemblies from the clips for later use.

While this disclosure includes one or more illustrative embodiments described in detail, it is understood that the one or more embodiments are each capable of modification and that the scope of this disclosure is not limited to the precise details set forth herein but include such modifications that would be obvious to a person of ordinary skill in the relevant art including (but not limited to) changes in material selection, size, socket or bulb design, number, shape, thickness, number, and spacing of tabs, environment of use, number, strength, and arrangement of magnets used with a clip, and the like.

What is claimed is:

1. A bulb holder clip for receiving and holding a socketed light bulb, the bulb holder comprising:

a tubular body extending along a longitudinal axis from an open first end to an axially opposite second end, an end wall closing the second end of the body, the body surrounding an interior volume of the body extending along the axis, the body and the end wall together comprising an outer surface of the clip;

a slot extending axially along the body, the slot comprising a first end and an opposite second end spaced away from the first end of the slot, the first end of the slot axially being spaced away from the first end of the body and the second end of the slot being spaced away from the second end of the body;

the slot extending through the body and in communication with the interior volume of the body, the slot extending in an angular direction about the longitudinal axis between opposite sides of the slot whereby a socket for a light bulb can be received into the slot to receive and hold a light bulb inserted through the open first end of the body; and a magnet disposed on the outer surface, the magnet comprising an exposed surface being spaced from the outer surface and being configured to engage against a magnetic surface to hold the clip to the magnetic surface.

2. The bulb holder clip of claim 1 wherein the magnet is disposed on the end wall.

3. The bulb holder of claim 2 wherein the magnet is a circular magnet.

4. The bulb holder clip of claim 2 wherein the magnet comprises an outer perimeter surface surrounding the magnet, and the end wall comprises a rim surrounding the outer perimeter surface of the magnet.

5. The bulb holder clip of claim 1 wherein the magnet is a disposed on the body.

6. The bulb holder clip of claim 5 wherein the magnet is a bar magnet.

7. The bulb holder clip of claim 6 wherein the magnet comprises an outer perimeter surface surrounding the magnet, and the body comprises a rim surrounding the outer perimeter surface of the magnet.

8. The bulb holder clip of claim 6 wherein the body comprises a pair of elongate walls extending axially, the magnet being disposed between the pair of walls.

9. The bulb holder clip of claim 6 wherein the body comprises a uniform outer diameter portion extending from the first end of the body towards the second end of the body and a reduced outer diameter portion extending from the uniform diameter portion to the second end of the body, the outer diameter of diameter portion decreasing as the reduced diameter portion extends towards the second end of the body, and at least a portion of the pair of walls extend axially along the reduced diameter portion away from the magnet.

10. The bulb holder of claim 1 wherein the slot extends more than 180 degrees about the longitudinal axis between the sides of the slot.

11. The bulb holder of claim 1 comprising a spring arm being disposed in the interior volume of the body, the spring arm extending from the end wall towards the first end of the body.

12. The bulb holder of claim 1 comprising a plurality of tabs being disposed at the open first end of the body, the tabs extending inwardly from the first end into the interior volume.

13. The bulb holder of claim 12 wherein adjacent pairs of tabs of the plurality of tabs define a gap between the adjacent pairs of tabs that permit water to flow through the gap.

14. The bulb holder clip of claim 1 wherein the body comprises a wall portion having an outer surface spaced from the interior volume by a thickness of the wall portion and the wall portion comprises a through hole extending through the thickness and opening into the interior volume.

15. The bulb holder clip of claim 1 comprising a socket disposed in the interior volume of the body and a light bulb extending through the open end of the body and into the socket.

16. The bulb holder clip of claim 1 wherein the socket is a C7 or C9 socket and the bulb is C7 or C9 bulb.

17. The bulb holder clip of claim 15 comprising the socket being connected to a wire, the wire extending through the slot from the bulb and extending away from the body.

18. The bulb holder clip of claim 15 wherein the magnet is engaged against a magnetic holding surface.

19. The bulb holder clip of claim 15 wherein the magnet is engaged against a non-magnetic holding surface, the non-magnetic holding surface being sandwiched between a magnetic material and the magnet wherein the magnet urges the magnetic material towards the non-magnetic holding surface.

20. The bulb holder clip of claim 1 wherein the magnet comprises a plurality of magnets, including a first magnet attached to the body and a second magnet attached to the end wall.

* * * * *